US011526461B2

(12) United States Patent
Nasser et al.

(10) Patent No.: US 11,526,461 B2
(45) Date of Patent: Dec. 13, 2022

(54) ENHANCED SECURE ONBOARD COMMUNICATION FOR CAN

(71) Applicant: Renesas Electronics America Inc., Milpitas, CA (US)

(72) Inventors: Ahmad Nasser, Livonia, MI (US); Tobias Belitz, Ratingen (DE)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 17/307,929

(22) Filed: May 4, 2021

(65) Prior Publication Data

US 2021/0271626 A1 Sep. 2, 2021

Related U.S. Application Data

(63) Continuation of application No. 16/805,404, filed on Feb. 28, 2020, now Pat. No. 11,016,926.

(60) Provisional application No. 62/932,409, filed on Nov. 7, 2019.

(51) Int. Cl.
*G06F 13/42* (2006.01)
*H04L 9/06* (2006.01)

(52) U.S. Cl.
CPC ........ *G06F 13/4282* (2013.01); *H04L 9/0631* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 2012/0163400 A1 | 6/2012 | Hartwich | |
| 2014/0068126 A1 | 3/2014 | Itou et al. | |
| 2017/0305368 A1* | 10/2017 | Markham | ........... B60R 16/0231 |
| 2018/0295112 A1* | 10/2018 | Coppola | ................... H04L 9/14 |

* cited by examiner

*Primary Examiner* — Idriss N Alrobaye
*Assistant Examiner* — Dayton Lewis-Taylor
(74) *Attorney, Agent, or Firm* — Foley & Lardner LLP

(57) ABSTRACT

According to certain general aspects, the present embodiments relate generally to securing communication between ECUs. Example implementations can include a method of securely transmitting Controller Area Network (CAN) protocol frames via a CAN controller.

15 Claims, 7 Drawing Sheets

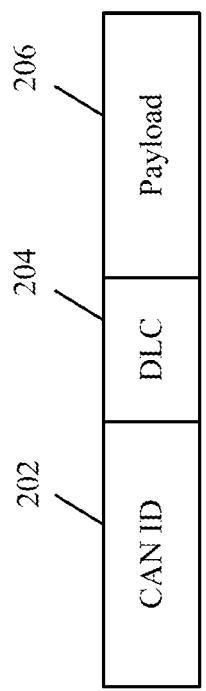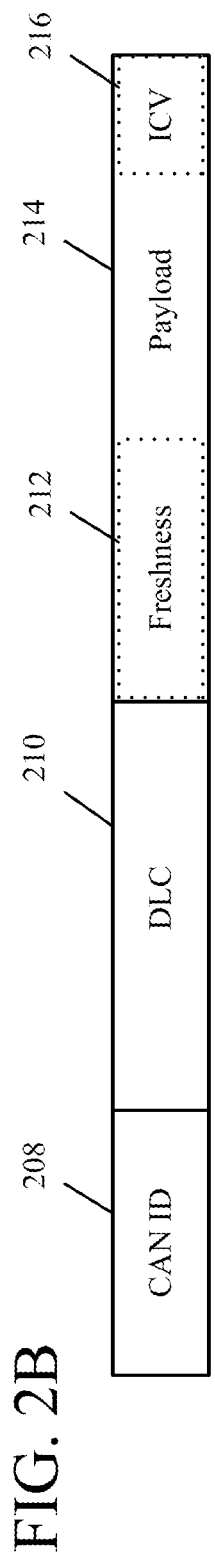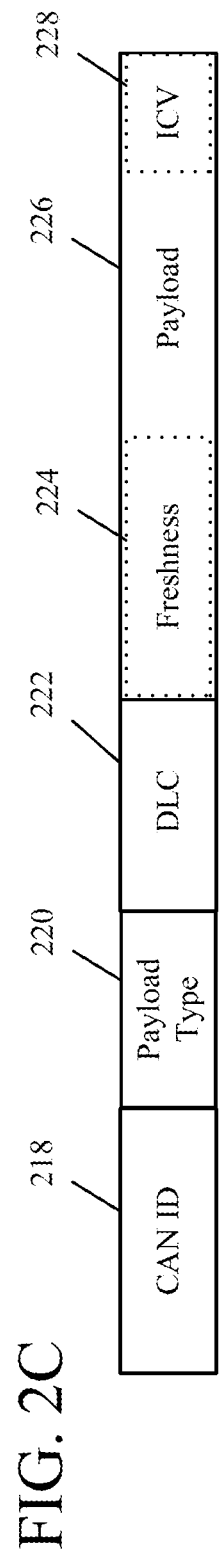
FIG. 2A
FIG. 2B
FIG. 2C

ENHANCED SECURE ONBOARD COMMUNICATION FOR CAN

CROSS-REFERENCE TO RELATED PATENT APPLICATIONS

This application is a continuation of U.S. patent application Ser. No. 16/805,404, filed Feb. 28, 2020, which application claims priority to U.S. Provisional Patent Application Ser. No. 62/932,409, entitled "ENHANCED SECURE ONBOARD COMMUNICATION FOR CAN XL," filed Nov. 7, 2019, the contents of all such applications being hereby incorporated by reference in their entirety and for all purposes as if completely and fully set forth herein.

TECHNICAL FIELD

The present embodiments relate generally to data communications, and more particularly to securing Controller Area Network ("CAN") protocol communications between Electronic Control Units ("ECU") within a system.

BACKGROUND

An ECU is a generic term for an embedded system that controls one or more subsystems in cars. Examples of ECUs include Engine Control Module ("ECM"), Powertrain Control Module ("PCM"), Transmission Control Module ("TCM"), Brake Control Module ("BCM"), and Suspension Control Module ("SCM"). Traditionally, ECUs that need to communicate with one another need to be connected to one another. These components were connected by "point-to point wiring." As systems became more advanced and more ECUs could fit within a system, point-to-point wiring became increasingly complicated.

Presently, instead of ECUs directly connected to one another to communicate with one another, ECUs are connected to a bus, or a communication channel. The ECUs share the bus, meaning that only certain ECUs can access the bus and send data through the bus at certain times. Protocols are sets of rules that establish certain windows where data may be transmitted on the bus. Different protocols were created to combat the problem of multiple ECUs using the bus at the same time, causing data collisions on the bus and prohibiting the successful communication of ECUs.

The CAN protocol is one of the protocols used in establishing rules for ECU communications in cars. There are other CAN protocols, such as CAN with Flexible Data Rate ("CAN FD") and CAN Extra Long ("CAN XL"), that increase the bit rate and capacity of the messages in the CAN protocol. CAN is one of five protocols used in the on-board diagnostics—II vehicle diagnostics standard ("OBD"). The OBD standard has been mandatory for all cars and light trucks sold in the United States since 1996. The OBD standard has been mandatory for all petrol vehicles sold in the European Union since 2001 and all diesel vehicles since 2004.

Although these standards and protocols have improved the ability of ECUs to communicate with each other, many problems remain, for example in connection with providing security over such communications.

SUMMARY

According to certain general aspects, the present embodiments relate generally to securing communication between ECUs. In some embodiments, this can be done by utilizing the excess data payload space in the CAN protocols. According to certain other aspects, security features such as sender authentication and message originality can be implemented at the protocol level, reducing the delays associated with implementing security features at higher levels in the communication stack. Additionally, the complexity of the security configuration is minimized by implementing the security features in hardware.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 2A is a block diagram of the data structure of a frame using the CAN protocol without security.

FIG. 2B is a block diagram of the data structure of a frame using the CAN FD protocol with security.

FIG. 2C is a block diagram of the data structure of a frame using the CAN XL protocol with security.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

As set forth above, the present embodiments relate generally to securing communication between ECUs. As further mentioned above, ECUs in cars often communicate with one another using the standard CAN protocol. As such, the ECUs in the car communicate using a CAN bus. Among other things, the present Applicant recognizes that, without security, a hacker, or a person who is trying to get access to data without the sender or receiver giving permission to the person, may infiltrate the ECU communication.

Figure 1:
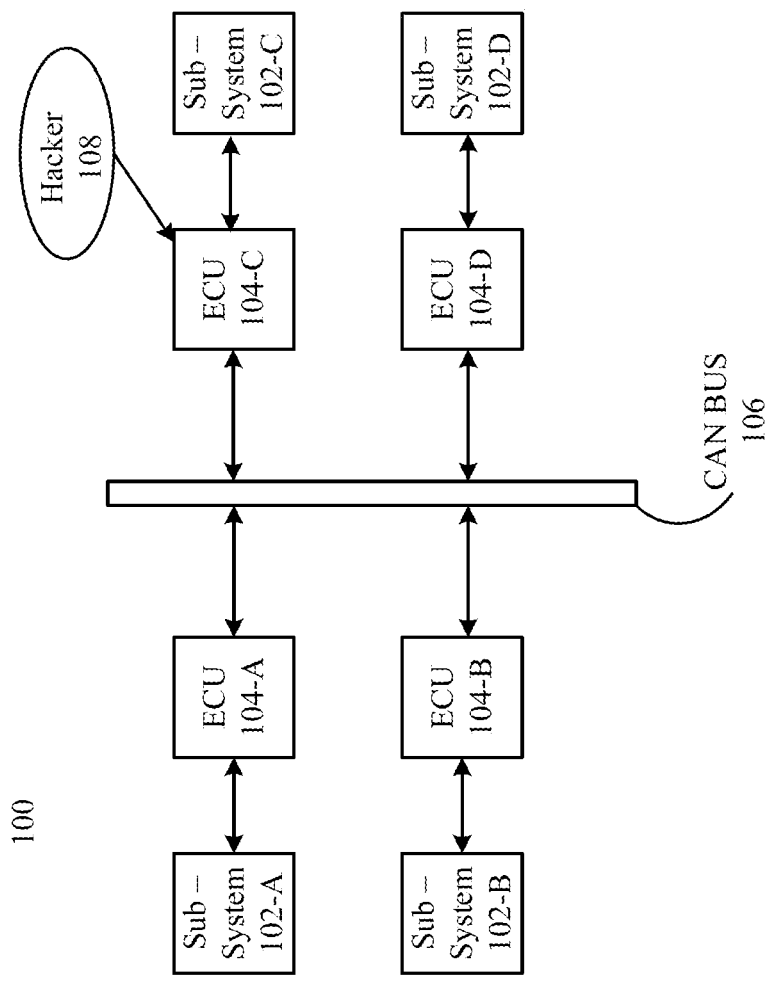
FIG. 1 is a block diagram illustrating the need for security when utilizing the CAN protocol.

FIG. 1 is a block diagram for illustrating the need for security when utilizing the CAN protocol. System 100 is an exemplary embodiment of a system that utilizes ECUs. An example of such a system is a car. Devices 102, (102-A, 102-B, 102-C, and 102-D) are subsystems that are controlled by the ECU. Exemplary subsystems include the engine, powertrain, transmission, brake, and suspension. Devices 104, (104-A, 104-B, 104-C, and 104-D) are ECUs. The ECUs control the subsystems of the system. The CAN bus, 106, is the communication channel that the ECUs use to communicate with one another. While the ECU is comprised of many different modules and components, present embodiments relate generally to the CAN controller, which is the component of the ECU that interfaces directly with the CAN bus and processes received data from the CAN bus to send, for example, to the CPU, an additional component of the ECU.

As further shown in FIG. 1, a hacker 108 is attempting to gain unpermitted access to system 100 via one of the ECUs 104 (e.g. via a wireless communication channel such as Bluetooth). For example, a replay attack is when a hacker observes a message in a communication channel, and then sends the observed message again. This type of attack can cause disruptions on the bus, prohibiting subsequent data from reaching its intended destination. Alternatively, the ECU may receive the replayed message and execute the contents of the message again. This type of attack can be particularly harmful in the context of cars. For example, a message could be sent to the ECM telling the ECM to increase the speed of the car. A hacker could replay that same message to the ECM several times, causing the car to accelerate to unintended speeds. Ensuring that only an original message was received, or preventing replay attacks, can be accomplished by securing the integrity and freshness of CAN messages.

Additionally, without an added security layer of the CAN messages, a hacker 108 could generate fake messages and send these fake messages to an ECU. For example, a hacker could create a message that looks like it was sent from the PCM to the ECM, telling the ECM to increase the speed of the car. This type of message could be particularly harmful in the context of cars because a third party could dictate the functioning of the car while another person is inside the car. In other words, a hacker could cause a car to accelerate while the driver is trying to command the car to slow down.

Ensuring that the messages the ECUs send to one another are sent from the intended sender can be done by authenticating the message identifiers.

FIG. 2A is a block diagram of the data structure of a frame using the CAN protocol without security. ECUs communicate by sending frames to one another using the CAN protocol. A frame is a unit of data that is used in communication. Not every ECU needs to receive every frame. For example, the SCM does not need to receive frames that are intended for the ECM. CAN controllers within ECUs can determine whether the frames are relevant by checking the CAN identification ("ID") 202 of the frames on the CAN bus. Certain CAN IDs are relevant for certain ECUs. If the CAN ID is relevant to an ECU, the CAN controller will receive that frame from the CAN bus and process the data in the frame. If the CAN ID is not relevant to the ECU, then the CAN controller can ignore the frame. The data length code ("DLC") 204 tells the receiving CAN controller the length of the intended message, or payload 206 within the frame. Using the DLC information, the CAN controller can determine the number of bytes in the payload section of the CAN message which may include security information.

FIG. 2B is a block diagram of the data structure of a frame using the CAN FD protocol with security. The CAN FD protocol is an improvement to the CAN protocol because it can transmit up to 8 Mbit/sec, as opposed to CAN transmitting 1 Mbit/sec, and its frames can carry 64 bytes, as opposed to CAN's 8 byte capacity. While this protocol has made substantial improvements to the CAN protocol, the CAN FD protocol still has frames that are structured the same as CAN protocol frames. Thus, CAN ID 208 is similar in function and structure to CAN ID 202 of FIG. 2A. DLC 210 is similar in function and structure to DLC 204 in FIG. 2A. However, the extra space in the CAN FD protocol allows for security mechanisms to be implemented into the payload 214 of the frames. These security fields include a freshness field 212 and an Integrity Check Values ("ICV") 216.

The purpose of the payload field is to house the message that is being communicated. Thus, the message data will be placed in this field. Additionally, the extra space in the payload field can be used to store additional information about the frame. For example, the freshness field 212 can be reserved from some of the excess payload bits. The information in the freshness field can be used to indicate the freshness, or the originality, of the data. In one embodiment, 8 bytes should be reserved for the freshness field. As discussed above, the freshness of the data can be used to defend against replay attacks.

One or more bits in the payload may indicate whether the frame is fresh. Determining whether the frame is fresh prevents the system from processing frames that may have been replayed. The extra space in the payload allows for such distribution of the data. Freshness information can be inserted into the payload.

In one embodiment, one or more bits can be placed in the payload 214 that indicates whether the frame is authenticated. The extra space in the payload 214 allows for such distribution of the data. Additionally, the extra space in the payload 214 can be used to store authentication data. For example, the extra space in the payload field 214 while using the CAN FD protocol can be used to store ICV 216. The bits reserved for ICV information can be used to ensure that the data in the frame is authentic. In one embodiment, 16 bytes may be reserved for ICV 216. Authentication data can be used to ensure that the sender of the data is the actual sender of the data, minimizing the possibility of a hacker sending a frame and the receiver processing the data in the fake frame.

In one embodiment, a register can be reserved in the CAN controller that specifies the number of security bits that can be transmitted and truncates the security data to the specified number of bits. In one embodiment, the authentication data may be truncated such that the data fits in the payload, or that less bits of data need to be reserved.

For example, the Automotive Open System Architecture group ("AUTOSAR"), which is a worldwide partnership of automotive interested parties, has proposed a secure communication concept using CAN extra information in frame payloads.

Figure 3:
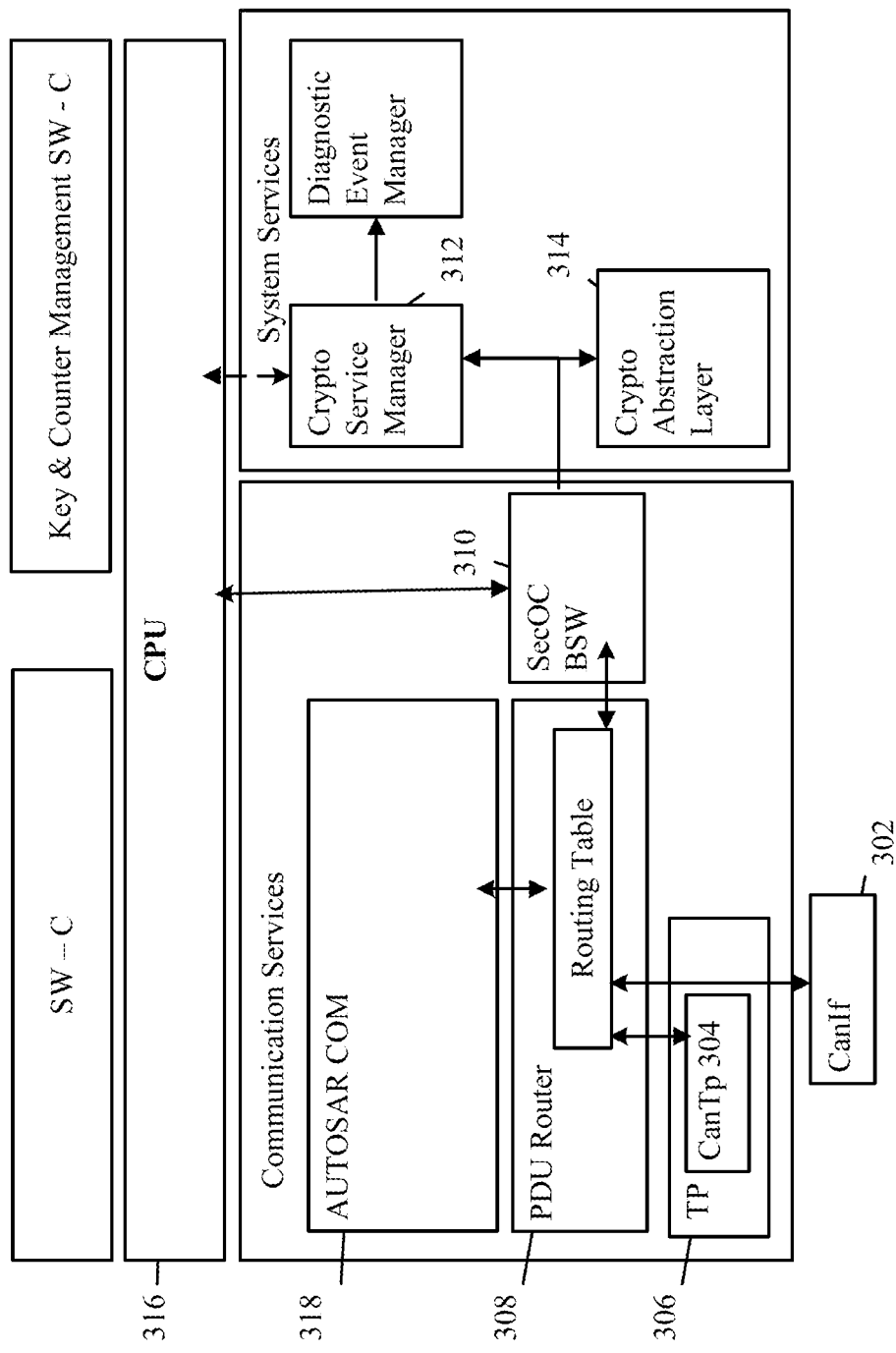
FIG. 3 is a block diagram of the AUTOSAR Proposed Secure Communication concept.

FIG. 3 is a block diagram of the AUTOSAR Proposed Secure Communication concept. This mechanism for securing CAN frames is implemented in software. As such, the solution requires an abundance of CPU runtime overhead that can cause delays. In FIG. 3, the ECU receives a frame. The CAN interface ("CanIF"), 302 sends the frame that it received from the CAN bus to the Protocol Data Unit ("PDU") Router 308. The PDU Router 308 determines the type of protocol to read the frame. If the frame has security information inside of it, the PDU Router sends the frame to the Secure Onboard Communication Basic Software module ("SecOC BSW"), 310, where the SecOC BSW sends the frame to the Crypto Service Manager ("CSM") 312 for authentication verification. The SecOC BSW 310 also interfaces with the CPU 316 to get the freshness value from the freshness value manager, used in evaluating the freshness of the frame. Upon successful authentication, the SecOC BSW 310 sends the contents of the frame back to the PDU Router 308, which sends the frame to the Autosar Communication Module ("AUTOSAR COM") 318. AUTOSAR COM is the module that passes data to the CPU to be further processed by the application. FIG. 3 illustrates the various data transfer operations and software layers required in implementing the AUTOSAR proposed secure communication concept.

The present Applicant has recognized various shortcomings of conventional and proposed approaches such as the one described above. For example, the AUTOSAR proposed secure communication solution of securing CAN messages is a software only solution. As such, implementing this solution requires adding overhead to the data processing time, causing delays in the ECU accessing the message embedded in the data. This is not an ideal solution because delays can be problematic in the context of cars. For example, it could be dangerous for there to be a delay when the BCM needs the message "slow down." Thus, software delays should be avoided when securing the CAN messages.

According to certain aspects, the present embodiments are directed to a hardware based security solution. In these and other embodiments, certain changes or adaptations can be included in, or implemented with, a new CAN XL protocol.

FIG. 2C is a block diagram of the data structure of a frame using the CAN XL protocol with security. The CAN XL protocol is an improvement to the CAN protocol because it can transmit up to 10 Mbit/sec and its frames have a capacity of 2048 bytes.

In one embodiment, CAN ID 218 is similar to function and structure of CAN ID 208 of FIG. 2B and CAN ID 202 of FIG. 2A. The DLC 222 is similar to function and structure of DLC 210 of FIG. 2B and DLC 204 of FIG. 2A but takes on larger values due to the larger payload size in the CAN XL protocol. The CAN XL protocol is proposing a new field, Payload Type 220. The Payload Type 220 indicates whether the frame is authenticated, authenticated and encrypted, or just plain text. This information is helpful to the CAN controller because based on this information, the CAN controller knows how to process the frame. Based on the data in the payload type, the CAN controller may need to prepare to decrypt the frame, check for authentication, or merely receive the frame. In addition, the information in this field dictates whether the information in other fields is going to be message information or overhead. The Payload Type field 220 tells the CAN controller what to expect. In one embodiment, bits from the payload type should be reserved such that the CAN controller can determine the type of data it is extracting from the frame and can process the frame accordingly.

The extra space in the CAN XL frame allows for reserving additional fields in the protocol to support data authenticity and freshness protection. The added security is at the protocol level, as opposed to higher levels of the communication stack, meaning the CAN controller is able to implement security as the CAN controller operates at the protocol level. Having a security enabled CAN controller means that the CPU in the ECU is not burdened with security operations, thereby reducing CPU overhead and latency in receiving and transmitting secure CAN frames.

Figure 4B:
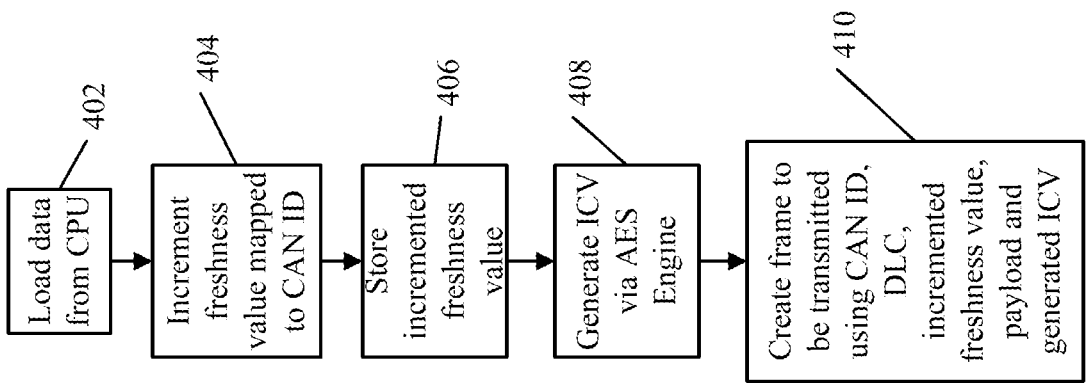
FIG. 4B is a flowchart illustrating an exemplary frame transmission methodology according to embodiments.
Figure 4A:
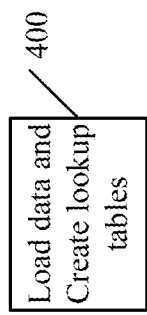
FIG. 4A is a flowchart illustrating exemplary set-up processes for configuring a CAN controller to transmit secure messages according to embodiments.

FIG. 4A is a flowchart illustrating exemplary set-up processes for configuring a CAN controller to transmit secure messages according to embodiments. Set-up processes may occur during initialization of the CAN controller. During initialization, the CPU is responsible for configuring the registers in the CAN controller. In block 400, data may be loaded into the CAN controller from the CPU and/or the hardware security module ("HSM"). Data loaded into the CAN controller includes, but is not limited to, digital keys from HSM and initialized freshness values, and user preferences from the CPU as discussed further below. The data loaded into the CAN controller is stored in Random Access Memory ("RAM") in the CAN controller, and preconfigured lookup tables are created in the CAN controller that map the loaded data to the data stored in the RAM. In one embodiment, preconfigured lookup tables map CAN IDs to both a digital key index and a loaded initialized freshness value. In an alternate embodiment, a user can specify how the freshness values are initialized.

As discussed above, each CAN controller does not need to receive every frame on the CAN bus. Thus, CAN controllers are initialized such that the CAN controller will transmit only certain CAN IDs. These CAN IDs may be the preconfigured CAN IDs in the lookup table.

In an alternate embodiment, a user can specify how the CAN IDs and initialized freshness values are mapped to the digital key indices. For example, instead of the CAN controller mapping each CAN ID and initialized freshness value to a unique digital key index, the user can specify that several CAN IDs and freshness values are mapped to the same digital key index. Thus, fewer digital keys are required. The user's specifications are stored in the CPU and loaded into the CAN controller during initialization.

In one embodiment, a second preconfigured lookup table maps the loaded digital keys from the HSM to a digital key index. By mapping the loaded digital keys to a digital key index in the CAN controller, the host CPU will not have access to the digital key. This is preferable both as a security measurement and also as a means of reducing the computational processing that the CPU would perform in securing frames.

In alternate embodiments, policy can be configured to load the keys into RAM addressed by the second CAN controller register if a secure boot has succeeded to ensure that the CPU, and subsequently the ECU, cannot be misused by tampered software.

FIG. 4B is a flowchart illustrating an exemplary frame transmission methodology according to embodiments. In block 402, the CAN controller receives a frame to be transmitted from the CPU. In block 404 the freshness value associated with the CAN ID of the frame to be transmitted is incremented. Incrementing the freshness value is a means of tracking whether the transmitted frame is original. The freshness value may be incremented by a user defined step, and is associated with a CAN ID via the lookup table. In block 406, the CAN controller stores the incremented freshness value in the memory of the initialized freshness value. Thus, the lookup table iteratively updates each frame that is to be transmitted. In block 408, the ICV is generated. The ICV is the means of tracking the authenticity of the frame. The ICV is generated by the Advanced Encryption Standard ("AES") Engine housed inside the CAN controller, using at least the CAN ID of the message to be sent, DLC, the digital key mapped to the CAN ID of the message to be sent, and the payload. In alternate embodiments, additionally, the freshness value, and the payload type may be used to generate the ICV via the AES Engine. The types of information provided to the AES Engine at the transmitter CAN controller will also be provided to the receiver CAN controller. For example, if the freshness value is used to generate the ICV at the transmitting CAN controller, then the receiving CAN controller will also use the freshness value to generate a corresponding ICV. In block 410, the frame to be transmitted is created using the CAN ID, DLC, incremented freshness value, payload, and generated ICV.

Figure 5:
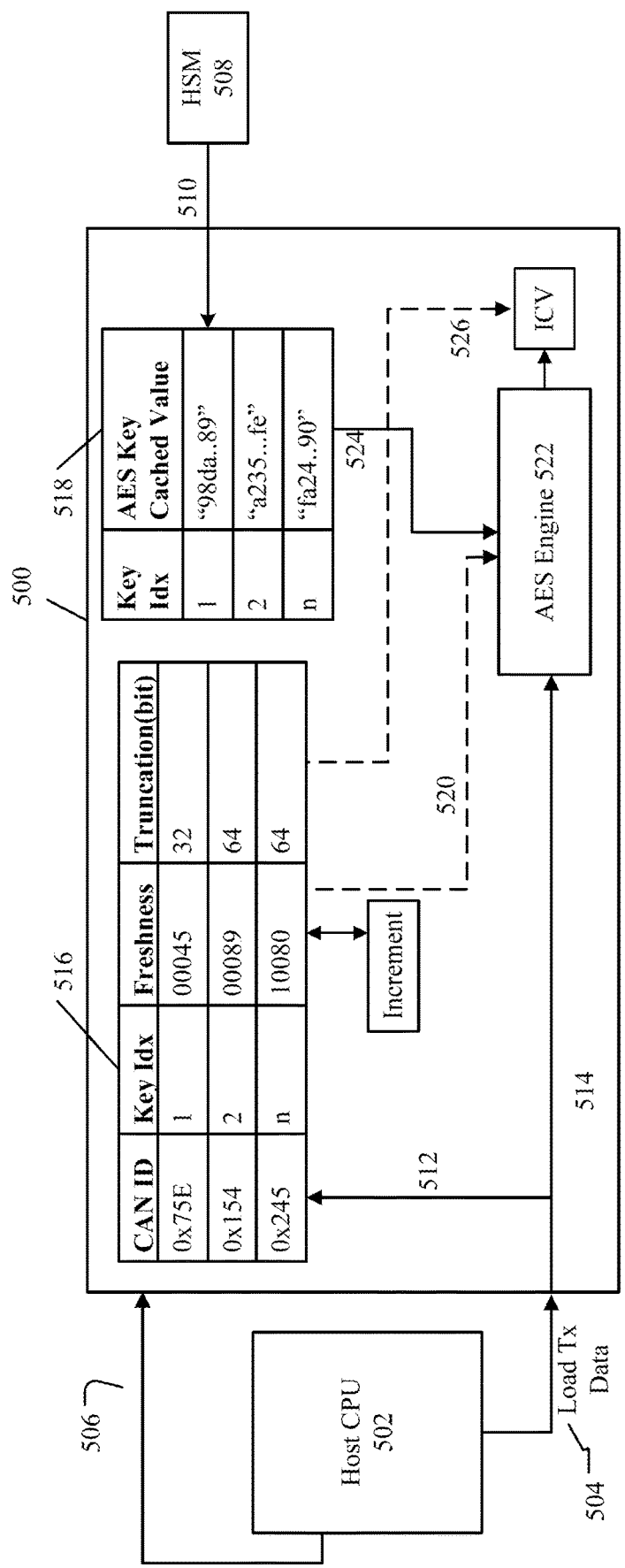
FIG. 5 is a block diagram depicting an exemplary embodiment of a transmitter system for secure communication using a CAN controller in connection with methods and systems described herein.

FIG. 5 is a block diagram depicting an exemplary embodiment of a transmitter system for secure communication using a CAN controller in connection with methods and systems described herein.

Depending on the instructions in the one or more bits in the payload field, or payload type field, of the received frame from the CPU, the CAN controller 500 may determine to authenticate the frame. The frame may be authenticated by sending the information from the first register of the CAN controller 516 and the second register of the CAN controller 518 to the AES Engine 522 to generate an ICV, as discussed further below.

While security information is able to be stored in the payload of a frame, there are instances when the security information is too lengthy to be completely stored in the payload of the frame. In these such instances, the ICV can be truncated to a predetermined length of bits. In one embodiment, the user determines the number of bits to be truncated. These user defined preferences may be loaded into the CAN controller upon initialization of the CAN controller.

Host CPU 502 represents the higher level processing that is done in the software of the ECU. In FIG. 5 for example, a message from the host CPU 502 is to be transmitted. Thus, the data to be transmitted from the host CPU is loaded into the CAN controller 500, illustrated by 504. The loaded data from the CPU to the CAN controller includes at least the CAN ID, the DLC, and the payload, as discussed above and illustrated in FIG. 2C and/or FIG. 2B.

The hardware security module ("HSM") is a device that protects and manages digital keys. A digital key is a string of bits used to encrypt or safeguard information. In one embodiment, symmetric key encryption is used, or the same key is used to both encrypt the data and decrypt the data. Thus, keeping the digital keys protected by the HSM is important to having secure data. In one embodiment, when the CPU initializes, the HSM 508 loads one or more digital keys into RAM addressed by a second CAN controller register 518, as illustrated by 510. In an alternate embodiment, the HSM 508 copies one or more digital keys into RAM addressed by the second CAN controller register, as illustrated by 510. The CPU never has access to the keys loaded into the CAN controller by the HSM device. AES Engine 522 is a module inside the CAN controller that receives at least the CAN ID, DLC, and payload data, indicated by 514. The second register of the CAN controller sends a digital key to the AES Engine 522, indicated by 524. The digital key sent to the AES Engine 522 is based on the digital key index of the CAN ID from the first register of the CAN controller 516. The CPU is not involved in securing the frame after it has assisted in the initial setup. The AES Engine 522 generates an ICV based at least on the CAN ID, DLC, payload, and digital key. In alternate embodiments, the AES Engine 522 can use the freshness value to generate the ICV, indicated by 520. In alternate embodiments, the AES Engine 522 can use the payload type to generate the ICV. The ICV is used for data authentication at the receiving CAN controller 700. In an alternate embodiment, the ICV may be truncated to a certain number of bits based on the configured lookup table in the first register 516. The CAN controller truncates the ICV based on the CAN ID used in generating the ICV.

The CAN controller 500 increments the initialized freshness value that is mapped to the CAN ID when the CPU determines to transmit a CAN ID. The incremented freshness value is stored in RAM addressed by the first register of the CAN controller 516 in the place of the initialized freshness value corresponding to the CAN ID.

In an alternate embodiment, the user can specify how the freshness values are incremented. For example, the freshness values can increment by 1 each time a CAN ID associated with a freshness value is processed. Alternatively, the user can specify that the freshness values increment by 3 each time the freshness value associated with the CAN ID is processed. The user's specifications are stored in the CPU 502 and loaded into the CAN controller upon initialization.

Referring to FIG. 2C, the transmitting CAN controller 500 may create a secure frame to be transmitted on the CAN bus using the incremented freshness value 224 and the generated ICV 228. In an alternate embodiment, the CPU may instruct the CAN controller, via bits in the payload field 226 or payload type field 220, to transmit a frame without any security features.

Figure 6A:
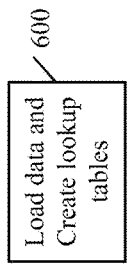
FIG. 6A is a flowchart illustrating exemplary set-up processes for configuring a CAN controller to receive secure messages according to embodiments.

FIG. 6A is a flowchart illustrating exemplary set-up processes for configuring a CAN controller to receive secure messages according to embodiments. Set-up processes may occur during initialization of the CAN controller. During initialization, the CPU is responsible for configuring the registers in the CAN controller. In block 600, data may be loaded into the CAN controller from the CPU and/or the HSM. Data loaded into the CAN controller includes, but is not limited to, digital keys from HSM and initialized freshness values, a window of acceptable freshness value, and user preference from the CPU. The data loaded into the CAN controller is stored in RAM in the CAN controller, and preconfigured lookup tables are created in the CAN controller that map the loaded data to the data stored in the RAM. In one embodiment, preconfigured lookup tables map CAN IDs to both a digital key index and a loaded initialized freshness value. In an alternate embodiment, a user can specify how the freshness values are initialized.

As discussed above, each CAN controller does not need to receive every frame on the CAN bus. Thus, CAN controllers are initialized such that the CAN controller will receive only certain CAN IDs. These CAN IDs may be the preconfigured CAN IDs in the lookup table.

In an alternate embodiment, a user can specify a window of acceptable freshness values. For example, if the receiving CAN controller extracts a freshness value of 45 from the payload of the received frame, and the user defined an acceptable window of freshness values to be within +5 of the expected freshness value, then the CAN controller may determine that the extracted freshness value is acceptable if the expected freshness value is 50.

In one embodiment, another preconfigured lookup table maps the loaded digital keys from the HSM to a digital key index. By mapping the loaded digital keys to a digital key index in the CAN controller, the host CPU will not have access to the digital key. This is preferable both as a security measurement and also as a means of reducing the computational processing that the CPU would perform in securing frames.

In alternate embodiments, policy can be configured to load the keys into RAM addressed by the second CAN controller register if a secure boot has succeeded to ensure that the CPU, and subsequently the ECU, cannot be misused by tampered software.

Figure 6B:
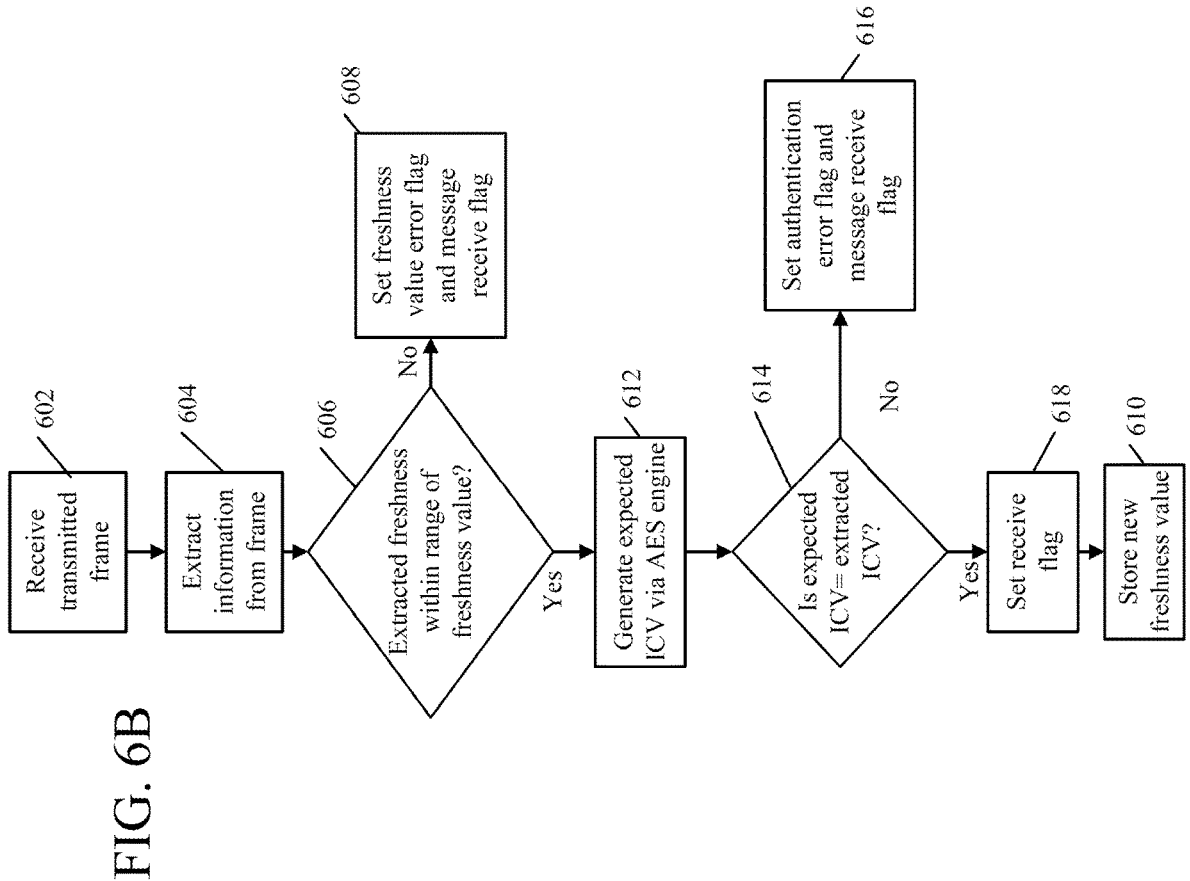
FIG. 6B is a flowchart illustrating an exemplary frame reception methodology according to embodiments.

FIG. 6B is a flowchart illustrating an exemplary frame reception methodology according to embodiments. In block 602, the CAN controller receives a frame from the CAN bus. In block 604, the receiving CAN controller extracts information from the frame. Information extracted from the frame may depend on whether CAN XL or CAN FD was used, and can include the CAN ID, the DLC, the payload type, bits indicating the payload type, the payload, the freshness value, and the ICV.

If the receiving CAN controller receives a freshness value, the CAN controller may run a check to determine if the frame has been replayed, or is not a fresh frame. As discussed above, the acceptable freshness value window may be user defined. If the extracted freshness value is within the acceptable freshness value window, then the CAN controller may continue processing the frame. If the extracted freshness value is outside the acceptable freshness value window, then the CAN controller may set a freshness value error flag and a message receive flag 608. These flags indicate that a frame has been received, but the CAN controller has determined that the information in the freshness value is unacceptable.

In block 612 an expected ICV is generated. The expected ICV is generated according to the same algorithm that was used to generate the ICV at the transmitter CAN controller. For example, if the freshness value is used in generating the ICV at the transmitting CAN controller, then the freshness value will be used in generating the expected ICV at the receiving CAN controller. The data that can be used in generating the expected ICV includes using the extracted frame information, such as, but not limited to the CAN ID, DLC, payload, and the digital key from the CAN controller. In alternate embodiments, additionally, the freshness value and the payload type may be used to generate the ICV.

In block 614, the CAN controller compares the expected ICV to the extracted ICV. If the values are the same, the CAN controller may set a receive flag, indicating that the CAN controller has received a frame 618. If the values are not the same, then the CAN controller may set an authentication error flag and a message receive flag 616. The CPU is not involved in making any decisions in how the data is processed. The data is processed by the CAN controller and the CPU reacts to the results, choosing to accept that data if it still wants to, based on the flags.

Upon verification of the ICV and the determination that the extracted freshness value is within an acceptable freshness window, then the freshness value stored in the RAM of the CAN controller is replaced with the extracted freshness value 610. Thus, the lookup table may be iteratively updated upon received frames. If the freshness value were stored when a frame had been fraudulently sent to the transmitter, or based on the determination that the extracted freshness value was outside the acceptable window of the expected freshness value, then it is more likely that the next frame compared by the CAN controller would also lie outside the acceptable window of freshness values. Thus, freshness values are only stored in the RAM of the receiving CAN controller when the extracted freshness values are within the acceptable window of freshness values and the ICV has been verified to avoid offsetting the transmitting CAN controller and the receiving CAN controller.

Figure 7:
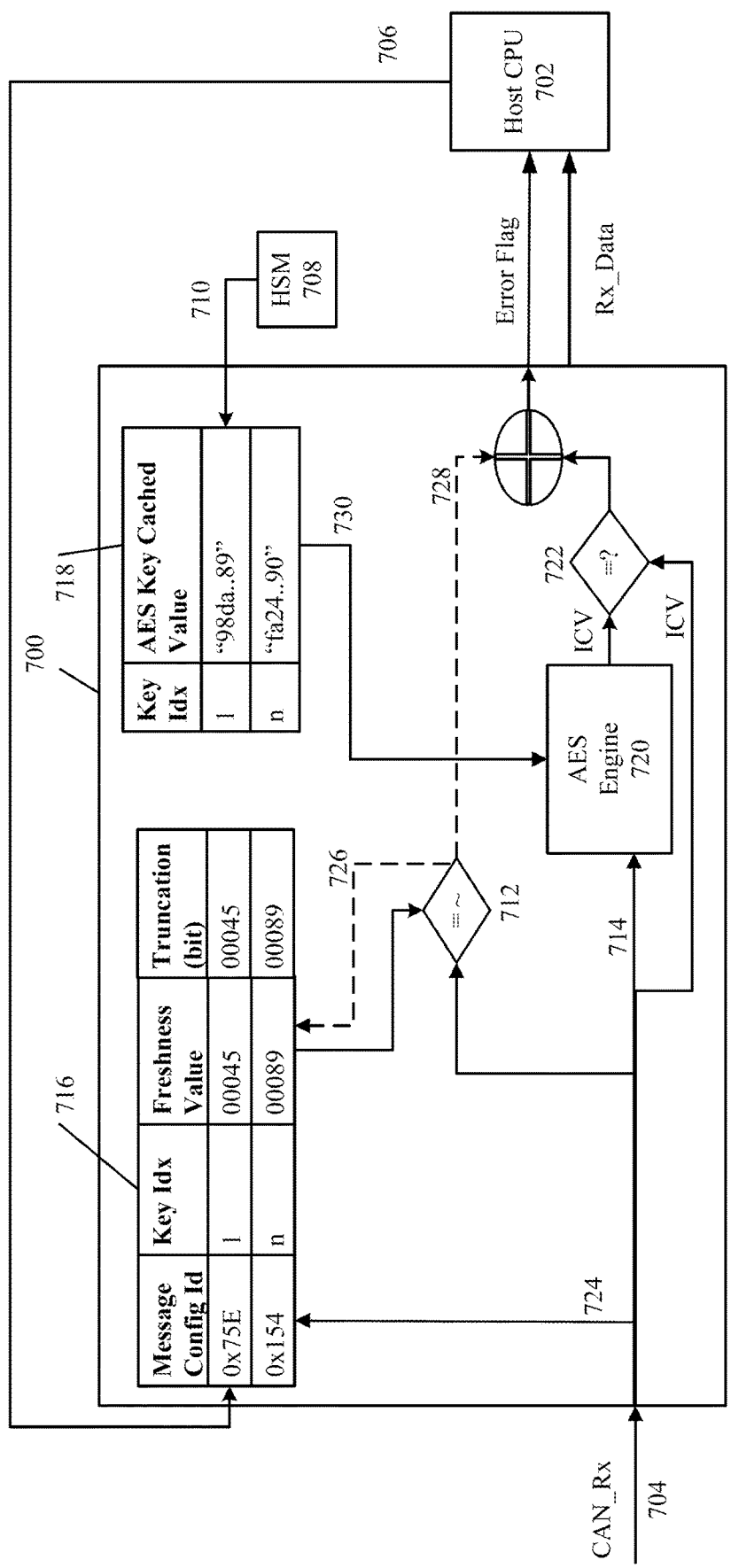
FIG. 7 is a block diagram depicting an exemplary embodiment of a receiver system for secure communication using a CAN controller in connection with methods and systems described herein.

FIG. 7 is a block diagram depicting an exemplary embodiment of a receiver system for secure communication using a CAN controller in connection with methods and systems described herein.

When the Host CPU 702 initializes, the CPU configures 706 the registers in the CAN controller with data including, but not limited to, user preference data, initialized freshness values, and CAN IDs that the receiving CAN controller should pick up from the CAN bus. RAM addressed by a first register in the CAN controller 716 will be loaded, by the CPU 702. A preconfigured lookup table in the first register of the CAN controller 716 will be loaded, mapping the digital key indices to the loaded CAN IDs and initialized freshness values. In one embodiment, the CPU may load user preferences for truncating the ICV into the first register of the CAN controller 716.

Additionally, when the CPU 702 initializes, the HSM 708 may load keys 710 into RAM addressed by the second register in the CAN controller 718. The HSM 708 at the receiver may load, or copy and then load, digital keys into RAM addressed by the second register in the CAN controller 718. The CPU never has access to the keys loaded into the CAN controller by the HSM device. In alternate embodiments, policy can be configured to load the keys into RAM addressed by the second CAN controller register 718 if a secure boot has succeeded to ensure that the ECU, and subsequently the CPU, cannot be misused by tampered software. The receiving HSM 708 will share the same digital keys as the transmitting HSM 508. Standard key distribution approaches can be used to ensure the digital keys between the two different devices are the same.

A second preconfigured lookup table in the second register in the CAN controller 718 may be loaded that maps the digital key indices that were loaded into the first register of the CAN controller 716 to the digital keys loaded by the HSM 708.

The receiving CAN controller 700 will receive data from the CAN bus as indicated by 704. Per CAN protocol, and referring to FIG. 2B, this data may have the structure: CAN ID 208, DLC 210 and Payload 214. As discussed above, referring to FIG. 2C, depending on the protocol used, the Payload 214 field may have additional information embedded within it such as Payload Type 220, Freshness 224 and ICV 228. Based on the information in the Payload Type 220, the CAN controller 700 may be instructed to extract data from a received frame without any security features. Alternatively, the Payload Type 220 may instruct the receiving CAN controller 700 to extract data from a frame that has been authenticated, encrypted, or authenticated and encrypted. Alternatively, there may be no Payload Type 220 indicating whether or not the frame is authenticated or encrypted. Alternatively, there may be bits in the payload field that indicate whether or not the frame is authenticated or encrypted. The CAN controller 700 will receive the transmitted frame from the CAN bus and determine how to unpack the frame, depending on the data in the Payload 226 or Payload Type 220.

FIG. 7 is an exemplary embodiment wherein the CAN controller 500 receives a CAN ID, DLC, freshness value, payload, and ICV, indicated by 704. The CAN controller 700 extracts the CAN ID, DLC, freshness value, payload, and ICV from the frame. Based on the extracted CAN ID, the CAN controller fetches the key index and expected freshness value associated with the CAN ID 724 using a lookup table 716.

The CAN controller 700 is able to determine whether the frame is fresh or not, or original, by determining whether the extracted freshness value is within an acceptable freshness value window, indicated by the comparing logic 712. If the freshness values are within an acceptable window, then the frame has likely not been replayed. Before updating the register value to the extracted value, the ICV has to be verified as discussed further below. If the verification is correct, then RAM addressed by the first register of the CAN controller 716 will subsequently store the extracted freshness value in place of the last freshness value 726. Thus, the lookup table may iteratively update for each received frame. If the freshness values are not within an acceptable window, the CAN controller 700 can set a freshness error flag and a message receive flag 728.

The receiving CAN controller 700 can check the authenticity of the received frame by sending at least the CAN ID, DLC, and payload to the AES Engine 720 as indicated by 714. The CAN controller 700 may send the digital key associated with the CAN ID 730 to the AES Engine 720, from the second register in the CAN controller 718. The CPU is not involved in determining whether the frame is secure after the CPU has assisted in the initial setup. Using at least the CAN ID, DLC, payload, and digital key, the AES Engine 720 will generate an expected ICV. In alternate embodiments, additionally, the AES Engine 720 can use the freshness value and payload type to generate the ICV if the AES Engine 522 at the transmitting CAN Controller 500 used the freshness value and payload type to generate the transmitted ICV. Comparing logic in the CAN controller 700, indicated at 722, will compare the expected ICV to the received ICV.

If the expected ICV and the received ICV are the same, the frame has likely not been forged. If the expected ICV and received ICV are not the same, the CAN controller 700 may set an error flag in addition to a received message flag to CPU 702. The CPU 702 can subsequently determine to drop the frame that had the incorrect ICV, or, continue processing the frame with the incorrect ICV, knowing that the frame may be a fake message. Alternatively, the CPU, although receiving the error flag, may determine to receive the frame.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A controller area network (CAN) controller for transmitting CAN protocol frames, the CAN controller comprising:
    a first CAN controller register configured to map a digital key index to at least one CAN identification (ID) and one or more freshness values;
    a second CAN controller register configured to map at least one digital key to the digital key index;
    a hardware security module (HSM) configured to load the digital key into random access memory (RAM) addressed by the second CAN controller register;
    a key engine configured to generate an integrity check value (ICV) based on one or more of the CAN ID, a data length code (DLC), a payload, and the digital key; and
    a transmitter configured to transmit a frame comprising the CAN ID, the DLC, an incremented freshness value based on the freshness value, the payload, and the ICV,
    wherein the CAN controller is configured to receive the CAN ID, the DLC, and the payload from a central processing unit (CPU), increment the freshness value to generate the incremented freshness value in response to the receiving the CAN ID, truncate the CAN ID based on truncation information mapped to the CAN ID and comprising a predetermined number of bits, store the incremented freshness value, and create the frame.

2. The CAN controller according to claim 1, wherein the key engine is further configured to generate the ICV based on a payload type associated with the payload.

3. The CAN controller according to claim 2, wherein the payload type is received by the CAN controller from the CPU.

4. The CAN controller according to claim 1, wherein the key engine is further configured to generate the ICV based on the freshness value.

5. The CAN controller according to claim 1, wherein the CAN control is further configured to:
    receive a payload type from the CPU; and
    determine to generate the ICV based on the received payload type.

6. The CAN controller according to claim 1, wherein the key engine comprises an advanced encryption standard (AES) engine.

7. A controller area network (CAN) controller for securely receiving CAN protocol frames, the CAN controller configured to:
    receive a frame transmitted from a receiver;
    extract a CAN identification (ID), a data length code (DLC), a freshness value, a payload, and an integrity check value (ICV) from the received frame;
    determine a freshness of the received frame based on an acceptable freshness; that corresponds to a maximum difference between the extracted freshness value and an expected freshness value;
    determine an authenticity of the received frame by comparing a generated ICV to the extracted ICV, and in response to the freshness of the received frame within the acceptable freshness window;
    determine to set a receive flag in response to the generated ICV matching the extracted ICV;
    determine to store the extracted freshness value in a first CAN controller register, based on the determining the freshness and the determining the authenticity of the frame; and
    overwriting a previous freshness value with the extracted freshness value based on the extracted CAN ID.

8. The CAN controller according to claim 7, wherein the expected freshness value is a predetermined numeric value.

9. A method of securely receiving controller area network (CAN) protocol frames, comprising:
- extracting a CAN identification (ID) and a freshness value from the received frame;
- determining a freshness of a received frame based on an acceptable freshness; that corresponds to a maximum difference between the extracted freshness value and an expected freshness value;
- determining to store the extracted freshness value in a first CAN controller register, based on the determining the freshness of the frame; and
- overwriting a previous freshness value with the extracted freshness value based on the extracted CAN ID.

10. The method according to claim 9, further comprising:
- extracting an integrity check value (ICV) from the received frame;
- determining an authenticity of the received frame by comparing a generated ICV to the extracted ICV, and in response to the freshness of the received frame within the acceptable freshness window.

11. The method according to claim 10, further comprising:
- determining to set a receive flag in response to the generated ICV matching the extracted ICV.

12. The method according to claim 10, wherein the determining to store the extracted freshness value comprises determining to store the extracted freshness value based on the determining the freshness and the determining the authenticity of the frame.

13. The method according to claim 9, wherein the expected freshness value is a predetermined numeric value.

14. The method according to claim 9, further comprising:
- extracting a data length code (DLC), a freshness value, a payload, from the received frame.

15. The method according to claim 9, further comprising:
- receiving a frame transmitted from a receiver.

* * * * *